FINAL SEALING APPARATUS FOR SEMICONDUCTOR TRANSLATING DEVICES

Filed July 7, 1955 4 Sheets-Sheet 1

INVENTOR,
FRED WOHLMAN, JR.
BY
Henry Heyman
ATTORNEY

INVENTOR,
FRED WOHLMAN, JR.
BY Henry Heyman
ATTORNEY

INVENTOR,
FRED WOHLMAN, JR.
BY
Henry Heyman
ATTORNEY

FINAL SEALING APPARATUS FOR SEMICONDUCTOR TRANSLATING DEVICES

Filed July 7, 1955 4 Sheets-Sheet 4

INVENTOR,
FRED WOHLMAN, JR.
BY
Henry Heyman
ATTORNEY

United States Patent Office 2,792,489
Patented May 14, 1957

2,792,489

FINAL SEALING APPARATUS FOR SEMICONDUCTOR TRANSLATING DEVICES

Fred Wohlman, Jr., Inglewood, Calif., assignor to Hughes Aircraft Company, Culver City, Calif., a corporation of Delaware Application July 7, 1955, Serial No. 520,407
7 Claims. (Cl. 219—85)

The present invention relates generally to an apparatus for assembling subassembly components of semiconductor translating devices, and relates more specifically to such an apparatus that is adapted for permanently joining one subassembly of a semiconductor device with another such subassembly; for advancing portions of the device towards each other; and for thereafter applying a welding pulse thereto.

In the manufacture of a semiconductor translating device such as, for example, transistors, diodes, rectifiers, photocell devices and the like, it is important that various components of these devices be assembled in a precise manner, in order that the output functions of the finished products may be held within accurate tolerance limits. The assembly of these devices is necessarily quite difficult in view of the relatively small sizes of the subassembly components and the delicate nature thereof. This difficulty is further complicated by the necessity for accurate handling of the various subassemblies in manners commensurate with the necessity for integration with other mass production techniques.

In many semiconductor translating devices, one subassembly component thereof comprises a metallic lead with a glass bead fused adjacent one end thereof and a bent or otherwise deformed whisker or contact member secured to this one end of the lead. The other subassembly component comprises a second lead having a glass bead fused thereto adjacent one end thereof, a glass tube secured to this bead and a semiconductor, in the form of a crystal, mounted on the portion of the lead enclosed by the glass tube. In accordance with the present invention, it is necessary that these two subassembly components be assembled in a manner to insert and fuse the bead, on the first lead, to the glass tube; position a free end of the whisker on the crystal; advance the whisker to a predetermined compression with regard to the crystal; and thereafter to apply a welding pulse across the two leads, whereby to establish a junction between the free end of the whisker and the crystal. In carrying out these particular assembly procedures, it is necessary that means be provided to prevent inadvertent damage to the previously assembled subassembly components either by actions of force or heat or a combination of these factors. Accordingly, it is extremely desirable, and in some cases absolutely necessary, that the components be positively held in position by means of the present apparatus and be aligned in a positive manner to produce a high quality finished product. This type of production, especially over long periods of time, must necessarily be handled in an automatic manner as far as is practical in order that human fatigue elements may thereby be reduced wherever practical.

Heretofore, the desired final assembly procedures for semiconductor translating devices utilized with the present mechanism, have either been carried out by hand, thus creating extreme inaccuracies due to the small components or have been assembled through use of multiple machines performing only limited functions. The necessary transfer of the components from one machine to another naturally raises the possibility that damage will occur to the delicate components. Such procedures of transfer are largely eliminated through use of the device of the present invention. Additionally, it has been found that various temperature and pressure conditions, if maintained throughout the period of manufacture and assembly of semiconductor translating devices, result in the production of higher quality products, with a considerably higher yield factor as to the number of such devices produced in a given time and with an accordingly lower rejection rate of poor products.

It is accordingly one important object of the present invention to provide a final sealing apparatus for semiconductor translating devices.

It is another important object of the present invention to provide an apparatus for assembling subassembly components for semiconductor translating devices wherein such components are accurately and precisely held in positive alignment, are positioned in the desired aspects relative to each other and are handled in a manner commensurate with the delicate nature of these components.

A further important object of this invention is to provide a final sealing device for subassembly components of semiconductor translating devices, wherein portions of the apparatus are counterbalanced in a manner to relieve an undesirable load on the delicate components, except as desired for particular assembly procedures.

Still another important object of the present invention is to provide a novel means for advancing a whisker in a semiconductor translating device with respect to another component, such as a crystal thereof, during and within properly sequenced time intervals when other acts are being performed in the assembly procedure.

A still further important object of the present invention is to provide novel means for alignably supporting and retaining subassembly components of semiconductor translating devices in an apparatus adapted for assembly of these components.

Another important object of the present invention is to provide novel means for inducing sequential operation and desired time delays during assembly of semiconductor translating devices by the apparatus of the present invention.

Other and further important objects of the present invention will become apparent from the disclosures in the following detailed specification, appended claims and accompanying drawings, wherein:

Figure 1:
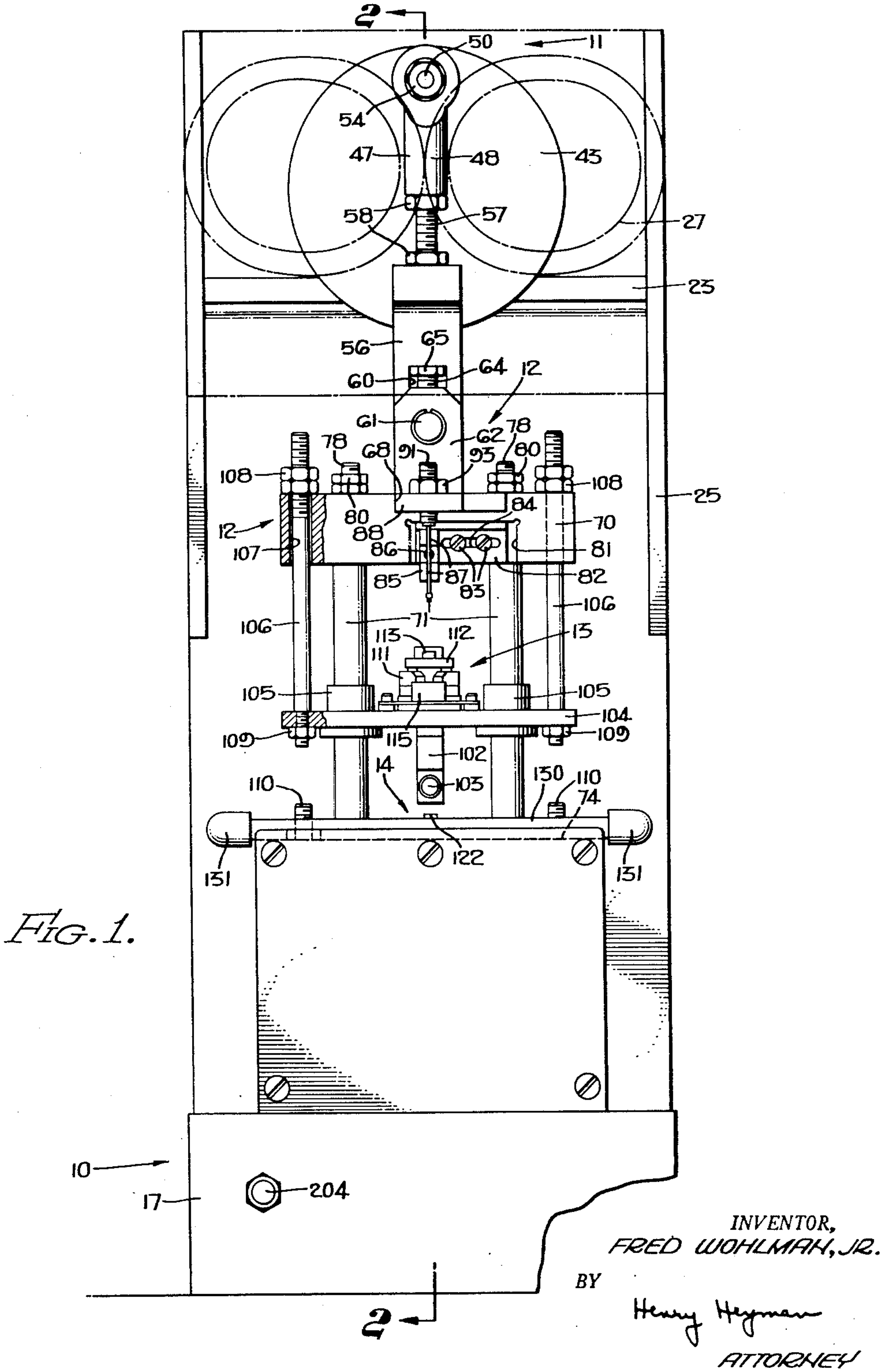
Figure 1 is a front elevational view of the apparatus of the present invention.
Figure 2:
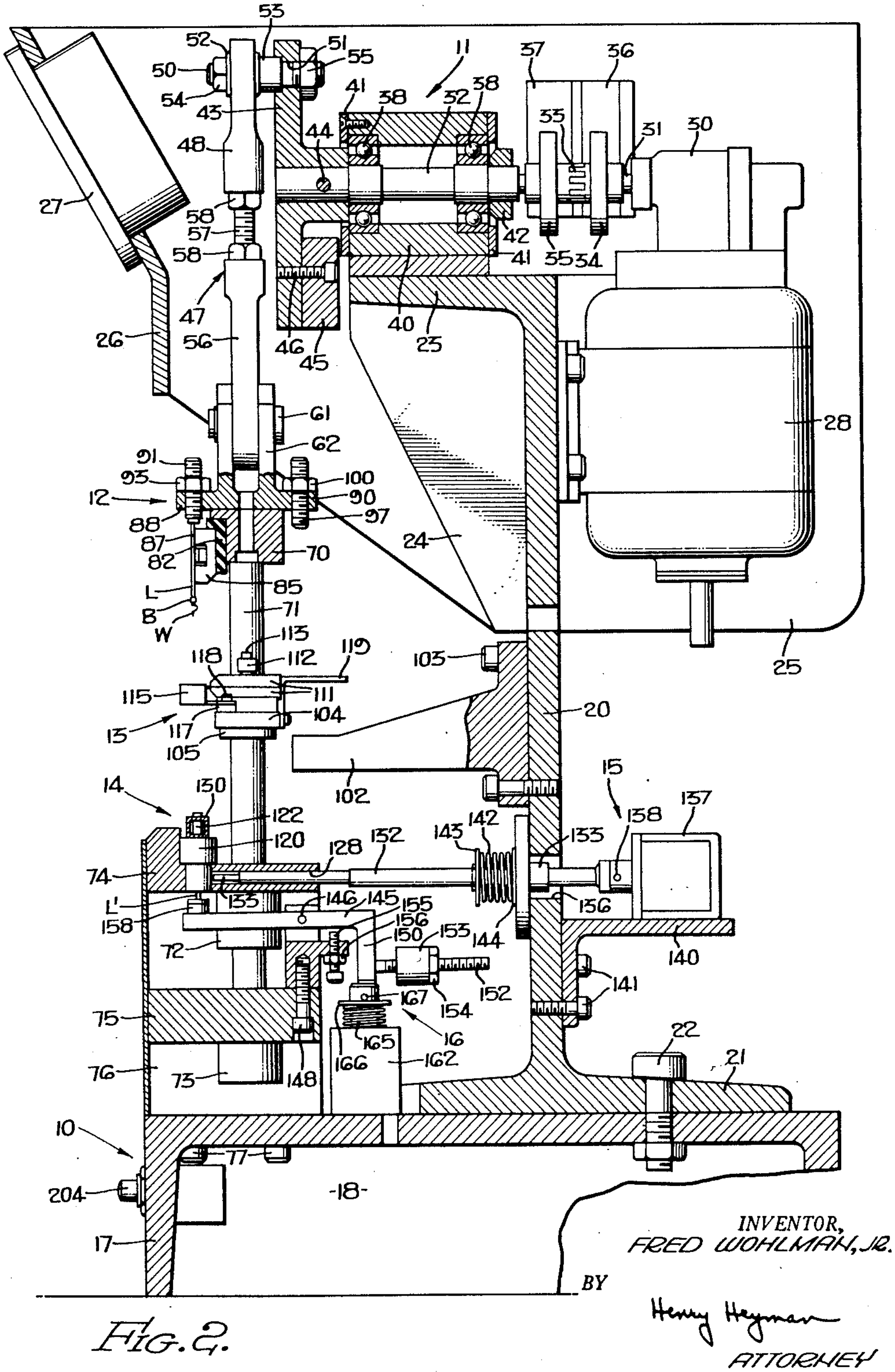
Fig. 2 is a sectional view through the apparatus of the present invention, as taken substantially as indicated by line 2—2, Fig. 1.

With reference to the drawings, wherein like reference characters denote like parts, and with reference primarily with Figs. 1 and 2, the apparatus of the present invention comprises generally a base supporting structure 10, a driving mechanism 11, a movable head and supporting structure 12, a heating element support arrangement 13, a stationary element support arrangement 14, a lead securing means 15 and a whisker advance arrangement indicated generally at 16.

The base and supporting structure 10 includes a base body portion 17 having a generally hollow interior 18. The body portion 17 has mounted thereon a vertically extended backing and support member 20, having a flanged lowered end 21 that is secured to the upper surface of the body 17 by means of suitable bolts 22. The upper end of the support 20 is provided with a platform portion 23, there being a stiffening web 24 disposed between the portion 23 and the vertical portion of the support 20. The platform 23, together with the vertical support 20 serve to support a cover member 25 that surrounds and protects the actuating mechanism of the present device and also serves as a support, through use of a front wall 26 thereof, for suitable instruments 27, as may be useful in determining operating characteristics of the present apparatus.

The support 20 has mounted on a rearward face thereof, a driving motor 28 that operates through a gear box and speed reducing unit 30 to drive a shaft 31. The shaft 31 is coupled with a second shaft 32, by means of a coupling 33. Each side portion of the coupling 33 serves to support one of a pair of cams 34 and 35 which cooperate with electric switches 36 and 37 respectively for a purpose to be hereinafter more fully described. The shaft 32 is journalled in a pair of roller bearings 38 that are carried by a bearing housing 40 which is in turn mounted on the platform 23. The bearings 38 are retained in position by means of annular retaining rings 41 which engage opposite ends of the housing 40, with movement of the shaft 23 axially with respect to bearings 38 being limited in one direction by means of a collar 42 that engages the shaft 32 intermediate one of the bearings 38 and the cam 35. The other end of the shaft 32 is fitted with a wheel 43 that is secured in position by means of a transversely disposed pin 44. It may be seen that the driving mechanism 11, including the motor 28, gear box 30, cams 34 and 35, shaft 32 and the wheel 43, is adapted for rotation by means of the motor 28 whereby to rotate the wheel 43 at a constant speed that will be interrupted in a manner to be described in detail hereinafter. The wheel 43 is provided, adjacent a segmental peripheral portion thereof, with a counterbalance weight 45 that is secured thereto by means of screws or the like 46.

The movable head and supporting structure 12 is connected to the driving wheel 43 by means of a link indicated generally at 47. The upper end of the link 47 includes a fitting 48 to which a mounting shaft 50 is attached. The mounting shaft 50 extends through an opening 51 through the wheel 43 and on an axis adjacent the periphery of the wheel and remote from the axis thereof. The shaft 50 further extends through a suitable bearing 52 in the fitting 48 and has an enlarged portion 53 disposed in a suitable recess in the forward face of the wheel 43. The shaft 50 is retained in position by means of nuts 54 and 55 which threadably engage the ends of the shaft.

Figure 3:
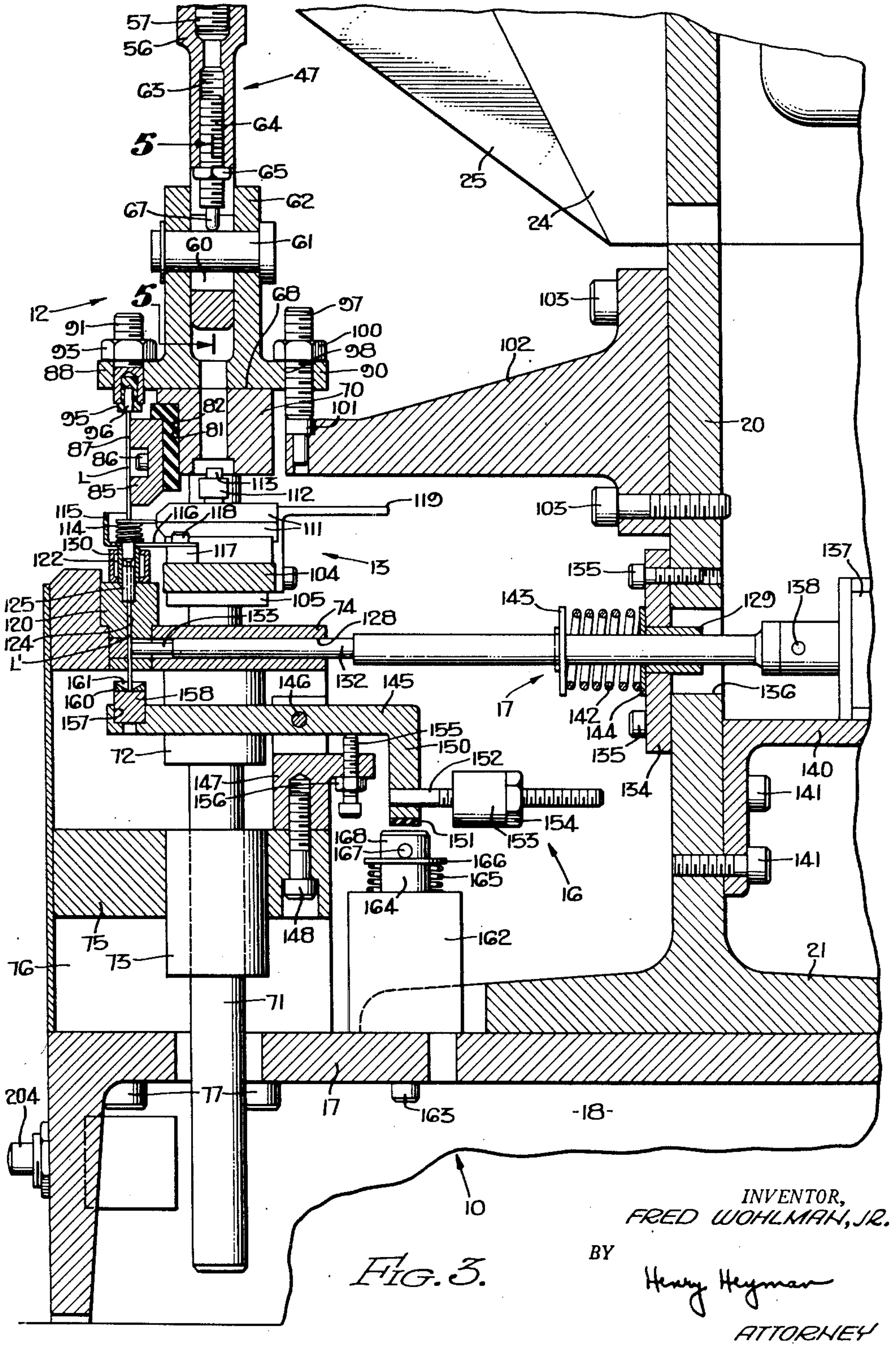
Fig. 3 is an enlarged fragmentary sectional view similar to portions of Fig. 2 with parts shown in different positions.
Figures 4, 5, 6:
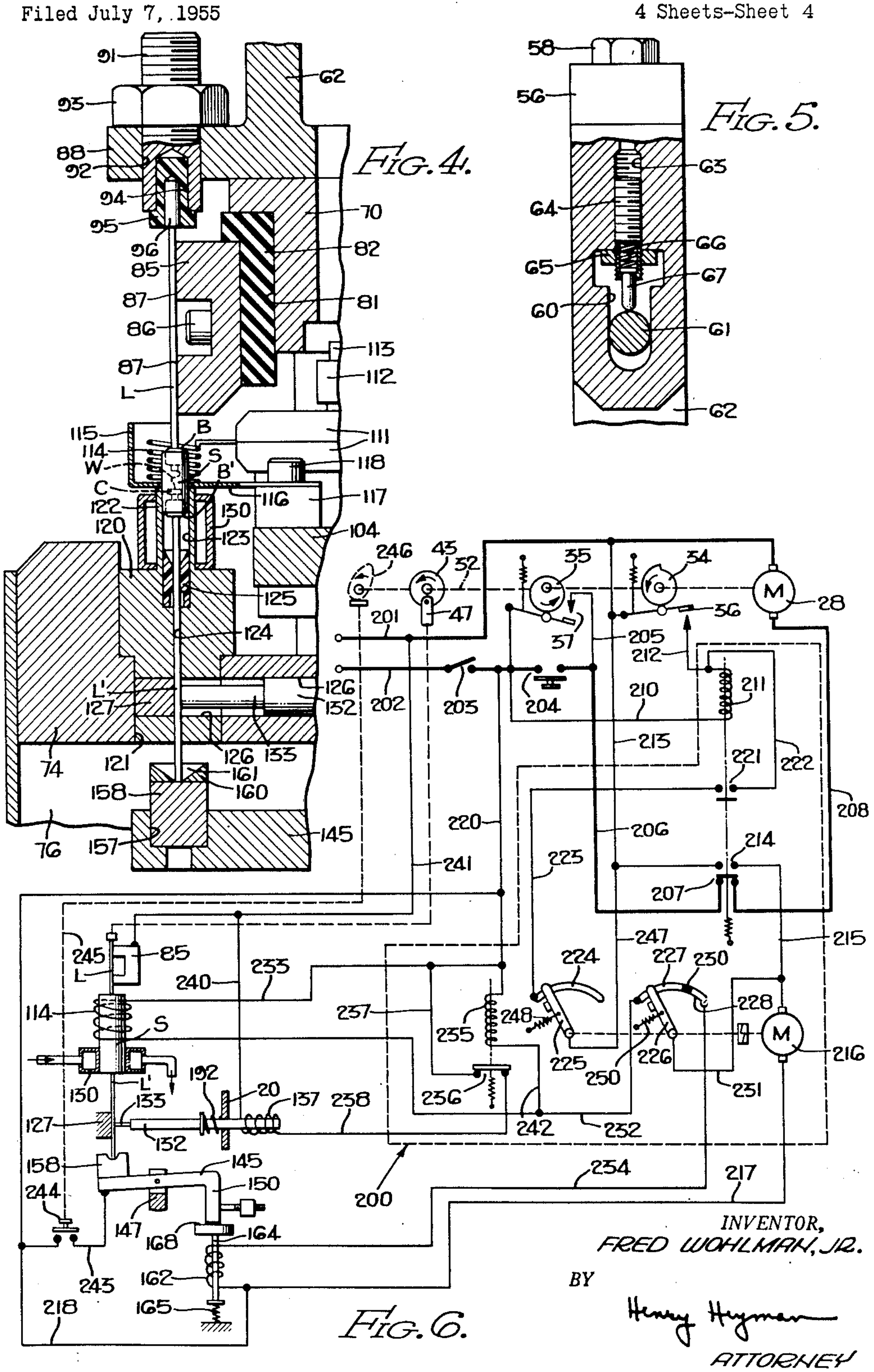
Fig. 4 is a still further enlarged fragmentary sectional view similar to portions of Fig. 3.
Fig. 5 is a detail fragmentary sectional view of a portion of the operating mechanism of the present apparatus, as taken substantially as indicated by line 5—5, Fig. 3.
Fig. 6 is a schematic view illustrating one form of wiring diagram that may be employed with the apparatus of the present invention.

The link 47 further includes a second fitting portion 56, the portion 56 being adjustably secured to the fitting 48 by means of a threaded stud 57 that extends between the fittings and which is locked in position by means of a pair of lock nuts 58. With reference primarily to Figs. 3 and 5, the fitting 56 has a transverse, generally T-shaped slot 60 therein in which a transversely disposed pin 61 is adapted for disposition. The pin 61 is connected to a bifurcated fitting 62 that is in turn connected, in a manner to be hereinafter more fully described, with the movable supporting head 12. The fitting 56 is further provided with an internal bore 63 that communicates with one end of the slot 60, there being a threaded sleeve 64 adjustably disposed in the bore 63 and locked in position therein by means of a lock nut 65. The sleeve 64 has a tubular interior passageway in which a compression spring 66 is disposed. The lower end of the compression spring is adapted to bear against a detent member 67, the other ends of this detent member being adapted for engagement with an upper surface of the transverse pin 61. Thus, it may be seen that the wheel 43 is connected to the movable supporting head 12 by means of the link 47 with this connection being resilient by reason of the mounting arrangement for the compression spring 66, acting through the detent 67 and the transverse pin 61.

As stated hereinbefore, the bifurcated fitting 62 is connected to the movable supporting head 12, such connection being accomplished by disposition of the fitting 62 in a suitable, generally rectangular slot 68 in a block portion 70 of the movable head 12. The block 70 has depended therefrom a pair of guide rods 71 which extended downwardly and through sleeve bearings 72 and 73, that are carried by transverse portions 74 and 75 of a bracket 76. The bracket 76 is mounted on the base member 17 and retained in position thereon by means of screws 77 or the like. The upper ends of the guide rods 71 are reduced in diameter and extend through the block 70, the upper ends thereof being threaded as at 78 for reception of lock nuts 80.

With reference primarily to Fig. 1, the block 70 is further provided with a forwardly and downwardly directed rectangular recess 81 in which an adjustable bracket 82 of dielectric material is positioned. The bracket 82 is mounted in the recess and retained therein by means of screws 83 which extend through an elongated slot 84 therein. The bracket 82 has mounted thereon a permanent magnet 85 that is secured in position by means of a screw 86. The faces of the magnet 85 are provided with vertically extending V-shaped grooves 87, the purpose of which will be later described.

As shown primarily in Figs. 3 and 4, the bifurcated fitting 62 is further provided with forwardly and rearwardly directed integral tab positions 88 and 90 which extend beyond the respective surfaces of the block body 70. The tab 88 has a vertically disposed adjustable lead stop member 91 that is threadably disposed in a vertical threaded bore 92 and locked in position therein by means of a lock nut 93. The lower end of the member 91 has a recess 94 therein, in which a block 95 of dielectric material is positioned. The block 95 has a metallic core 96 suitably disposed axially therein, the purpose of which will be later described.

The rearwardly directed tab 90, extending from the bifurcated fitting 62, is provided with stop member 97, which threadably engages a vertical bore 98 though the tab 90 and which is secured in position by means of a lock nut 100. The lower end of the stop member 97 is adapted for engagement with a hardened pin 101 that is carried by an outer end of an arm 102 that is in turn mounted on the vertical support 20 and retained thereon by means of suitable screws 103. The stop member 97, by engagement with the pin 101, serves to limit downward movement of the movable head structure 12.

The heating element support arrangement 13 includes a transversely disposed plate, plate 104, Fig. 1, that is fitted with sleeve bearings 105 that are adapted to surround the guide rod 71 and be slidable thereon. The transverse ends of the plate 104 are adapted for threadable reception of a pair of vertically disposed lifting rods 106. The lifting rods 106 extend upwardly and slidably through vertically extending bores 107 in transverse ends of the block 70 of the movable head structure 12 and are provided with a pair of heating element position adjusting lock nuts 108 on the upper ends thereof which are adapted to bear against an upwardly directed face of the block 70. The lower ends of the rods 106 are fitted with nuts 109 which engage the lower face of the plate 104 and serve to secure the rods 106 to the plate 104. Thus, the plate 104 is carried on the lower ends of the rods 106 and, upon downward movement of the movable head structure 12, the plate 104 will move gravitationally in a downward direction until the lower ends of the rods 106 contact a pair of adjustable heating element stop members 110 that are disposed upwardly from an upper surface of the transverse portions 74 of the bracket 76. Thereafter, the block 70, together with other portions of the movable head structure 12, will continue to be moved downwardly, the guide rods 71 sliding through the bearings 105 in the plate 104 and the lifting rods 106 slidably passing through the bores 107 in the block 70.

The plate 104 serves to support a pair of jaws 111, of dielectric material, that are secured in position by means of a transverse bar 112 and a screw 113. The jaws 111 have extended therefrom and serve to support a heating coil 114, a vertical axis of which is aligned with the V-shaped grooves 87 in the permanent magnet 85. The coil 114 is surrounded by a protective cover member 115 which has a lower wall position 116 that is mounted on the plate 104 by means of spacers 117 and screws 118. As will be hereinafter more fully described, the heating coil 114 is adapted for connection with a suitable source of electric energy, a bracket 119 carried by a rearwardly directed face of the plate 104 serving to support wires (not shown) leading to the coil.

With reference now primarily to Figs. 2, 3 and 4, the stationary element support arrangement 14 includes a support body 120 that is disposed in a vertical opening 121 in the portion 74 of the bracket 76. The body 120 has an integrally vertically extending reduced diameter sleeve portion 122, having an upwardly directed bore 123 which also extends into the body 120. A second reduced diameter bore 124 communicates between a lower end of the bore 123 and a lower surface of the body 120. The lower end of the bore 123 is fitted with a tubular guide member 125, of dielectric material, a bore therein being substantially identical to the bore 124. A lateral enlarged bore 126 is provided adjacent the lower end of the body 120 which extends through the body 120 and intersects the bore 124. One end of the bore 126 is filled with a hardened block 127. The other end of the bore 126 communicates with an elongated bore 128 formed in a longitudinal direction through the portion 74 of the bracket 76. The upper end of the sleeve 122 has a transversely disposed, generally rectangular conduit 130 disposed thereabout, the outer ends of the conduit 130, having fittings 131 mounted thereon to provide means for connecting this conduit to a source of liquid which is adapted to flow therethrough and acts to cool the sleeve 122 for a purpose also to be hereinafter more fully described.

The lead securing means 15 is adapted for cooperation with a stationary support element arrangement 14 and comprises an elongated rod 132 that is slidably disposed in the elongated bore 128 in the position 74 of the bracket 76. The rod 132 is provided with a reduced diameter tip portion 133 that has an end portion normally disposed within the confines of the bore 126. The rod 132 is slidably disposed through a sleeve bearing 129 that is carried by a plate bracket 134, which is in turn mounted on the vertical support 20 and retained in position by means of screws 135. An enlarged opening 136 in the support 20 serves to permit disposition of the bearing 129 and passage of the rod 132. The rearward end of the rod 132 is connected to a solenoid 137, by means of a fitting and pin arrangement 138, the solenoid 137 being mounted on an L-shaped bracket 140 that is secured to a rearward face of the support 20 by means of suitable screws 141. The rearward end of the rod 132 serves as an armature for the solenoid 137, the rod 132 being biased in a direction away from the solenoid by means of a compression spring 142 that is disposed between a flange 143, carried by the rod 132, and a washer 144 disposed on the forward face of the plate bracket 134. Thus, the rod 132 is normally urged in a direction to dispose the tip portion 133 thereof in the bore 126 as shown in Fig. 3. Energization of the solenoid 137, as shown in Fig. 2, serves to withdraw the tip portion 133 of the rod 132 from the bore 126 against the compressive force of the spring 142, this action being for a purpose to be hereinafter more fully described.

The whisker advance arrangement 16 includes a lever 145 that is pivotally mounted on a shaft 146 that is in turn carried by a bracket 147 that is secured to the portion 75 of the bracket 76 and retained thereon by means of suitable screws 148. The arm 145 has a generally downwardly extended portion 150, the lower end of which is fitted with a disk of cushion material 151. A threaded shaft 152 extends rearwardly from the portion of 150 of the arm 145, there being a weight 153 adjustably disposed on the shaft 152 and secured in position by a locked nut 154. Downward movement of the end of the arm 145 being effected by the weight 153 is limited by an adjustable stop screw 155, together with a lock nut 156 therefor. The other end of the arm 145, remote from the weight 153, has a vertically disposed recess 157 in which a permanent magnet 158 is disposed. The upper surface of the permanent magnet 158 has mounted thereon a guide member 160 having a conical depression 161 in the upper face thereof.

The whisker advance arrangement 16 further includes a solenoid 162 that is mounted on the upper face of the base body 17 and retained in position by means of screws 163. The solenoid 162 has an armature 164 that is urged upwardly from the solenoid by means of a compression spring 165 that is disposed between a washer 166, surrounding the armature 164, and one face of the body of the solenoid 162. The washer 166 is retained in position on the armature 164 by means of a pin 167 extending transversely through the armature 164. An upper surface 168 of the armature 164 is adapted for cooperation with the cushion member 151, carried by the arm 145, whereby, upon deenergization of the solenoid 162, to cause the arm 145 to rock about the pivot 146 in a direction away from the stop screw 155, this action being for a purpose to be hereinafter more fully described.

With reference to Fig. 6, the device of the present invention is connected with a suitable electrical circuit and sequence timing arrangement, indicated generally at 200, for a control of the present apparatus. As shown, energy is supplied through a pair of leads 201 and 202, lead 201 having the master switch 203 therein and a further push button switch 204, this switch also being shown in Fig. 3. Lead 201 extends to one side of the motor 28 while lead 202 extends to the normally closed switch 37, by way of a lead 205, and to the other side of the motor 28 by way of a lead 206, a pair of normally closed contacts 207 and a lead 208. The switch 37 is operable by the cam 35, while the normally open switch 36 is operable by the cam 34. The other side of the switch 37 is connected with a lead 210 that extends to the coil of a relay 211, the other side of this coil being connected to one side of the switch 36 by way of a lead 212. The other side of the switch 36 is connected to a lead 213 which extends between the lead 201 and another pair of normally open contacts 214. The contacts 214 are connected by way of another lead 215 to a timer motor 216, the other side of this motor being connected by a lead 217, a lead 218 and another lead 220, to the input supply lead 202. The relay 211 serves to control opening and closing of contacts 207 and 214 and further another pair of contacts 221. One of the contacts 221 is connected, by way of a lead 222, to the lead 212 extending between the relay 211 and the switch 36, while the other of the contacts 221 is connected, by way of a lead 223, to a stationary contact 224 in the timer, a movable wiper arm 225, driven by the motor 216, being adapted for passage over the contact 224. The motor 216 is also adapted to drive another contact arm 226 that is adapted for travel over stationary contacts 227 and 228 which are separated by means of an insulating portion 230. The contact arm 226 is connected, by way of a lead 231, to the lead 215, while the stationary contact 227 is connected, by way of a lead 232, to the heating coil 114. The heating coil is also connected, by way of a lead 233, to the lead 220 extending to the input lead 202. The stationary contact position 228 is connected, by way of a lead 234, to the solenoid 162, the other side of this solenoid being connected to the lead 218 which also extends ultimately to the input lead 202.

The circuit of the present invention includes another relay 235 which controls operation of normally closed contacts 236, one of these contacts being connected to the lead 233, by way of a lead 237 and thence to the input lead 202, while the other of the contacts 236 is connected, by way of a lead 238, to the solenoid 137, the other side of the solenoid being connected to a lead 240 which extends through a further lead 241 to the other input lead 201. The coil of the relay 235 has one end connected to the lead 233 and to the input lead 202, while the other side of this coil is connected, by way of a lead 242, to the lead 232 extending from the stationary contact 227. As shown in the drawing, the lead 241 also extends to the permanent magnet 85, there being another lead 243 extending from the arm 145 to the lead 218, which is in turn connected by way of the lead 220 of the other side of this circuit or lead 202. The lead 243 has a pushbutton switch 244, which may be used manually, or automatically operated through a lever arrangement 245 extending to a further cam 246 which may also be driven from the shaft 32.

In operation of the present device, with reference primarily to Fig. 2, an operator places a semiconductor translating device subassembly component comprising a lead L, a bead B and a whisker W, so that the lead L will reside and rest in the V-shaped grooves 87 of the permanent magnet 85. The upper end of this lead is adapted to abut, the wear resisting metallic plug 96, carried by the stop member 91, with this lead being maintained in absolute alignment by attraction of the magnet 85. Another element or subassembly component of the semiconductor translating device, having a lead L′, a glass sleeve S, a bead B′ and a crystal C, is next mounted in the device with the lead L′ being inserted through the bore 124 and into the conical recess 161, thereafter to abut the upper face of the permanent magnet 158, carried by the arm 155. With the device of the present invention at rest and with the master switch 203 closed, it will be seen that the solenoid 137 will be energized thereby to withdraw the tip 133 of the rod 132 from the bore 126. It is also to be noted that no current is initially delivered to the driving motor 28, inasmuch as both of the switches 36 and 37 and the pushbutton switch 204 are open.

Upon momentary closure of switch 204, the motor 28 will be energized through leads 206, contacts 207 and lead 208, with the pushbutton 204 being maintained closed until the cam 35 rotates to a point to permit closure of the switch 37. Thereafter the motor 28 continues to drive the cams 34 and 35 and the wheel 43, thus moving the movable head structure 12 and the heating element support arrangement 13 in a downward direction until the lower ends of the lifting rods 106 contact the stops 110. At this time, the lower plate 116 of the shroud 115 extending about the heating coil 114, is positioned in close approximation to or directly in engagement with the upper end of the sleeve 122, Fig. 4. The movable head structure 12 thereafter continues its downward movement until the stop member 97 engages the button 101. At this time, it is to be noted that the solenoid 162 will be deenergized, with the armature 164 thereof being in the position shown in Fig. 2, thereby permitting the sleeve S to reside in a low position within the sleeve 122. As the bead B enters the upper end of the sleeve S and the whisker W contacts the crystal C, as determined by the position of the adjustable stop member 97, the cam 34 will momentarily close the switch 36, this switch being then almost immediately opened. The closure of the switch 36 will complete the circuit for the relay 211, thereby energizing this relay and simultaneously opening contacts 207, to deenergize and stop the motor 28, and close the contacts 214 and 221. Thereafter, the coil 211 is maintained in an energized condition through a holding circuit defined by the lead 222, contact 221, lead 223, stationary contact 224, movable contact 225 and a lead 247, connected between the movable contact 225 and the lead 213. Closing of the contacts 214 serve to energize the timer motor 227, whereby to drive the movable contacts 225 and 226 across the stationary contacts 224, 227 and 228. As stated hereinbefore, contact 225 serves only in the holding circuit for the relay 211, while the contacts 214 also deliver energy to movable contact 226 and through the stationary contact 227 and lead 232 to the heating coil 114, the other side of which is connected to the input lead 202, thereby to energize the coil and cause heating of the upper end of the sleeve S, thereby to effect fusion between the sleeve S and the bead B. Simultaneous with energization of the heating coil 114, the relay 235 is also energized, whereby to open the contacts 236 and permit deenergization of the solenoid 137 and engagement of the tip 133 of the rod 132 with the lead L′, as shown in Figs. 3 and 4, thus to clamp the lead L′ between the rod tip 133 and the plug 127 and prevent any downward movement of the lead L′ as the bead B is being moved within the sleeve S. Any resistance to the movement of the bead B into the sleeve S is taken up by compression of the spring 66 in the link 47, this spring serving thereafter to move the movable head structure 12 downwardly to the limit defined by engagement of the adjustable stop member 97 with the button 101, the glass of the sleeve S becoming relatively plastic due to the heating thereof by the coil 114. It is also to be noted that the entire weight of the various structures carried by the wheel 43 is counterbalanced by the weight 45 thus further to protect the delicate components being assembled.

As the movable contact 226 leaves the stationary contact 227 and passes over the insulating strip 230, the heating coil 114 will be deenergized along with the relay 235, thereby to close the contacts 236 and again energize the solenoid 137 to remove the tip 133 from engagement with a lead L′. Upon contact of the movable contact 226 with the stationary contact portion 228, the solenoid 162 will be energized, through the leads 234 and 218, whereby to withdraw the face 168 of the armature 164 from the cushion 151 of the arm 145. The weight 153 is adjusted on the screw 152 in such a manner as to exert a predetermined force under the lead L′ whereby to advance the sleeve S further onto the bead B and the whisker W into greater compression with the crystal C, while the glass material of the sleeve S and bead B are in a semimolten state.

As the movable contact 225 leaves the end of the stationary contact 224, the holding circuit for the relay 211 will be opened whereby to deenergize this relay and cause the contacts 221 and 214 to open and the contacts 207 to close, thereby deenergizing the timer motor 216 and permitting the contacts 225 and 226 to return to their original positions by action of tension springs 248 and 250 respectively. Energization of the motor 28, by the closing of the contacts 207, serves again to drive the cams 34 and 35 and the wheel 43, whereby to raise the movable head structure 12 and heating element support arrangement 13, at the same time withdrawing the completed semiconductor translating device from the sleeve 122, the completed device being carried upwardly by the permanent magnet 85. As the structure 12 and arrangement 13 reach their upper limit, as shown in Fig. 2, the cam 35 will serve to open the switch 37, whereby to deenergize the motor 28, thus preparing the apparatus for the next cycle.

It may be seen that the movable contact 226 will leave the stationary contact 228 together with the leaving of the movable contact 225 from the stationary contact 224, thus also deenergizing the solenoid 162 and permitting upward movement, of the armature 164 by action of the compression spring 165, to the position shown in Fig. 2.

It may thus be seen that the device of the present invention finally seals the glass components of the semiconductor translating devices and advances the whisker W to the proper position desired relative to the crystal C. Additionally, just prior to reenergization of the motor 28 to lift the structure 12 and arrangement 13, the pushbutton 244 may be manually actuated, whereby to apply a welding pulse across the leads L and L′ to weld the whisker W to the crystal C and form the proper junction therebetween. As stated hereinbefore, the button 244 may also be automatically operated by means of the further cam 246, driven from a shaft 32. Thus, a completed, accurately assembled, positively aligned and precision translating device is automatically manufactured through precise timed intervals by action of the present apparatus. Additionally, the human element is eliminated as much as possible during these critical operations in order that all devices may be as alike as practical.

Having thus described the invention and the present embodiment thereof, it is desired to emphasize the fact that many modifications may be resorted to in a manner limited only by a just interpretation of the following claims.

What is claimed is:

1. A final sealing apparatus for subassemblies of semiconductor translating devices comprising, in combination: a base structure including a vertically disposed support depended therefrom; a driving mechanism including shaft means journalled on said support; means for rotating said shaft means; a movable head for removably supporting one of said subassemblies; means interconnecting said head and said mechanism whereby reciprocally to move said head; means for guiding said head during reciprocation thereof; a stationary support arrangement for another of said subassemblies; means for selectively securing said another of said subassemblies in said upport arrangement; a heating coil carried by and differentially movable in relation to aid movable head, said coil being adapted for disposition about said another of said subassemblies upon rotation of said driving mechanism, said movable head thereafter being adapted to position said one of said subassemblies in cooperative relationship with said another of said subassemblies; a timing mechanism; and movement limiting means for said head, operable by said driving mechanism and interconnected with said timing mechanism for first moving said head to said position for said cooperative relationship of said subassemblies and then returning said head to a starting position, said timing mechanism also serving to energize and deenergize said heating coil and said securing means in time sequence with said movement with said movable head to fuse an element of said one of said subassemblies with an element of said another of said subassemblies.

2. A final sealing apparatus for subassemblies of devices comprising, in combination: a base structure including a vertically disposed support depended therefrom; a driving mechanism including shaft means journalled on said support; means for rotating said shaft means; a movable head for removably supporting one of said subassemblies; resilient means interconnecting said head and said mechanism whereby reciprocally to move said head; means for guiding said head during reciprocation thereof; a stationary support arrangement for another of said subassemblies; means for selectively securing said another of said subassemblies in said support arrangement; a heating coil carried by and differentially movable in relation to said movable head, said coil being adapted for disposition about said another of said subassemblies upon rotation of said driving mechanism, said movable head thereafter being adapted to position said one of said subassemblies in cooperative relationship with said another of said subassemblies; stop means for travel of said head toward said cooperative relationship, said resilient means serving to compensate for resistance to movement of said one subassembly with the other; a timing mechanism; and movement limiting means for said head, operable by said driving mechanism and interconnected with said timing mechanism for first moving said head to said position for said cooperative relationship of said subassemblies and then returning said head to a starting position, said timing mechanism also serving to energize and deenergize said heating coil and said securing means in timed sequence with said movement with said movable head to fuse an element of said one of said subassemblies with an element of said another of said subassemblies, said resilient means acting to move said elements together following creation of a plastic condition thereof by said heating coil.

3. A final sealing apparatus for subassemblies of semiconductor translating devices comprising, in combination: a base structure including a vertically disposed support depended therefrom; a driving mechanism including shaft means journalled on said support; means for rotating said shaft means; a movable head for removably supporting one of said subassemblies; means interconnecting said head and said mechanism whereby reciprocally to move said head; means for guiding said head during reciprocation thereof; a stationary support arrangement for another of said subassemblies; means for selectively securing said another of said subassemblies in said support arrangement; a heating coil carried by and differentially movable in relation to said movable head, said coil being adapted for disposition about said another of said subassemblies upon rotation of said driving mechanisms, said movable head thereafter being adapted to position said one of said subassemblies in cooperative relationship with said another of said subassemblies; a timing mechanism; weight means operatively associated with said another of said subassemblies for advancing this subassembly relative to said one of said subassemblies; means for selectively supporting and releasing said weight means; and movement limiting means for said head, operable by said driving mechanism and interconnected with said timing mechanism for first moving said head to said position for said cooperative relationship of said subassemblies and then returning said head to a starting position, said timing mechanism also serving to energize and deenergize said heating coil, said weight means support, and said securing means in timed sequence with said movement with said movable head to fuse an element of said one of said subassemblies with an element of said another of said subassemblies.

4. A final sealing apparatus for subassemblies of semiconductor translating devices comprising, in combination: a base structure including a vertically disposed support depended therefrom; a driving mechanism including shaft means journalled on said support; means for rotating said shaft means; a movable head for removably supporting one of said subassemblies; means interconnecting said head and said mechanism whereby reciprocally to move said head; means for guiding said head during reciprocation thereof; a stationary support arrangement for another of said subassemblies; means for selectively securing said another of said subassemblies in said support arrangement; a heating coil carried by and differentially movable in relation to said movable head, said coil being adapted for disposition about said another of said subassemblies upon rotation of said driving mechanism, said movable head thereafter being adapted to position said one of said subassemblies in cooperative relationship with said another of said subassemblies; a timing mechanism; means for applying a welding pulse across portions of said subassemblies for joining elements thereof; and movement limiting means for said head, operable by said driving mechanism and interconnected with said timing mechanism for first moving said head to said position for said cooperative relationship of said subassemblies and then returning said head to a starting position, said timing mechanism also serving to energize and deenergize said heating coil, said pulse applying means and said securing means in timed sequence with said movement with said movable head to fuse an element of said one of said subassemblies with an element of said another of said subassemblies.

5. A final sealing apparatus for subassemblies of semiconductor translating devices comprising, in combination: a base structure including a vertically disposed support depended therefrom; a driving mechanism including shaft means journalled on said support; means for rotating said shaft means; a movable head for removably supporting one of said subassemblies; resilient means interconnecting said head and said mechanism whereby reciprocally to move said head; means for guiding said head during reciprocation thereof; a stationary support arrangement for another of said subassemblies; means for selectively securing said another of said subassemblies in said support arrangement; a heating coil carried by and differentially movable in relation to said movable head, said coil being adapted for disposition about said another of said subassemblies upon rotation of said driving mechanism, said movable head thereafter being adapted to position said one of said subassemblies in cooperative relationship with said another of said subassemblies; stop means for travel of said head toward said cooperative relationship, said resilient means serving to compensate for resistance to movement of said one subassembly with the other; a timing mechanism; weight means operatively associated with said another of said subassemblies for advancing this subassembly relative to said one of said subassemblies; means for selectively supporting and releasing said weight means; and movement limiting means for said head, operable by said driving mechanism and interconnected with said timing mechanism for first moving said head to said position for said cooperative relationship of said subassemblies and then returning said head to a starting position, said timing mechanism also serving to energize and deenergize said heating coil, said weight means support, and said securing means in timed sequence with said movement with said movable head to fuse an element of said one of said subassemblies with an element of said another of said subassemblies, said resilient means acting to move said elements together following creation of a plastic condition thereof by said heating coil.

6. A final sealing apparatus for subassemblies of semiconductor translating devices comprising, in combination: a base structure including a vertically disposed support depended therefrom; a driving mechanism including shaft means journalled on said support; means for rotating said shaft means; a movable head for removably supporting one of said subassemblies; resilient means interconnecting said head and said mechanism whereby reciprocally to move said head; means for guiding said head during reciprocation thereof; a stationary support arrangement for another of said subassemblies; means for selectively securing said another of said subassemblies in said support arrangement; a heating coil carried by and differentially movable in relation to said movable head, said coil being adapted for disposition about said another of said subassemblies upon rotation of said driving mechanism, said movable head thereafter being adapted to position said one of said subassemblies in cooperative relationship with said another of said subassemblies; stop means for travel of said head toward said cooperative relationship, said resilient means serving to compensate for resistance to movement of said one subassembly with the other; a timing mechanism; weight means operatively associated with said another of said subassemblies for advancing this subassembly relative to said one of said subassemblies; means for selectively supporting and releasing said weight means; means for applying a welding pulse across portions of said subassemblies for joining elements thereof; and movement limiting means for said head, operable by said driving mechanism and interconnected with said timing mechanism for first moving said head to said position for said cooperative relationship of said subassemblies and then returning said head to a starting position, said timing mechanism also serving to energize and deenergize said heating coil, said weight means support, said pulse applying means and said securing means in timed sequence with said movement with said movable head to fuse an element of said one of said subassemblies with an element of said another of said subassemblies, said resilient means acting to move said elements together following creation of a plastic condition thereof by said heating coil.

7. A final sealing apparatus for subassemblies of semiconductor translating devices comprising, in combination: a base structure including a vertically disposed support depended therefrom; a driving mechanism including shaft means journalled on said support; means for rotating said shaft means; a movable head for magnetically removably supporting one of said subassemblies; resilient means interconnecting said head and said mechanism whereby reciprocally to move said head; means for guiding said head during reciprocation thereof; a stationary support arrangement mounted on said base structure for another of said subassemblies; means for selectively securing said another of said subassemblies in said support arrangement and for aligning this subassembly with said one subassembly; a heating coil carried by and differentially movable in relation to said movable head, said coil being electrically operable and adapted for disposition about said another of said subassemblies upon rotation of said driving mechanism, said movable head thereafter being adapted to position said one of said subassemblies in cooperative relationship with said another of said subassemblies; liquid cooling means for portions of said another subassembly; stop means for travel of said head toward said cooperative relationship; said resilient means serving to compensate for resistance to movement of said one subassembly with the other; a timing mechanism; weight means operatively associated with said another of said subassemblies for advancing this subassembly relative to said one of said subassemblies: means for selectively supporting and releasing said weight means; means for applying a welding pulse across portions of said subassemblies for joining elements thereof; and movement limiting means for said head, operable by said driving mechanism and interconnected with said timing mechanism for first moving said head to said position for said cooperative relationship of said subassemblies and then returning said head to a starting position, said timing mechanism also serving to energize and deenergize said heating coil, said weight means support, said pulse applying means and said securing means in timed sequence with said movement with said movable head to fuse an element of said one of said subassemblies with an element of said another of said subassemblies, said resilient means acting to move said elements together following creation of a plastic condition thereof by said heating coil.

References Cited in the file of this patent

UNITED STATES PATENTS

| | | |
|---|---|---|
| 2,496,950 | Marcus et al. | Feb. 7, 1950 |
| 2,602,872 | Ziegler | July 8, 1952 |
| 2,697,774 | Adler et al. | Dec. 21, 1954 |